(12) United States Patent
Moro et al.

(10) Patent No.: US 6,512,193 B1
(45) Date of Patent: Jan. 28, 2003

(54) WIRE ELECTRIC DISCHARGE MACHINE (75) Inventors: Toshio Moro, Tokyo (JP); Seiji Satou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/721,629

(22) Filed: Nov. 27, 2000

Related U.S. Application Data (63) Continuation of application No. PCT/JP98/02363, filed on May 28, 1998.

(51) Int. Cl.[7] .............................. B23H 1/00; B23H 7/10
(52) U.S. Cl. ...................................................... 219/69.12
(58) Field of Search ........................................ 219/69.12

(56) References Cited

U.S. PATENT DOCUMENTS

| | | | |
|---|---|---|---|
| 5,126,524 A | * 6/1992 | Moro et al. | 219/69.12 |
| 6,294,748 B1 | * 9/2001 | Moro et al. | 219/69.12 |

FOREIGN PATENT DOCUMENTS

| | | | |
|---|---|---|---|
| JP | 57-121421 | 7/1982 | B23P/1/08 |
| JP | 63-162122 A | * 7/1988 | |
| JP | 1-109026 | 4/1989 | B23H/7/02 |
| JP | 5-69233 A | * 3/1993 | 219/69.12 |
| JP | 5-301117 A | * 11/1993 | 219/69.12 |
| JP | 5-305524 A | * 11/1993 | |
| WO | 90/11157 | 10/1990 | B23H/7/10 |

OTHER PUBLICATIONS

International Search Report, No Publication date.

* cited by examiner

*Primary Examiner*—Geoffrey S. Evans
(74) *Attorney, Agent, or Firm*—Sughrue Mion, PLLC (57) ABSTRACT

In a wire electric discharge machine in which the processing liquid exists between a wire electrode 2 and a work piece 3, and the work piece 3 is processed while the discharge is being generated, the wire electric discharge machine has a jetting nozzle 140 to jet the processing liquid to the work piece 3, and a wire guide portion to flow the processing liquid to the jetting nozzle 140 and to guide the wire electrode 2 into a bored hole, and the wire guide portion has the first passage 133b to flow the processing liquid into the jetting nozzle, and the second passage 131b to convert the direction of the processing liquid to be flowed into the first passage 133b.

4 Claims, 7 Drawing Sheets

WIRE ELECTRIC DISCHARGE MACHINE

This is a continuation of PCT/JP98/02363, filed May 28, 1998, pending.

BACKGROUND OF THE INVENTION

The present invention relates to an improvement of a mechanism to jet the processing liquid of a wire electric discharge machine, and to stably supply the higher flow velocity processing liquid to a gap between the work piece and a wire electrode.

Figure 6:
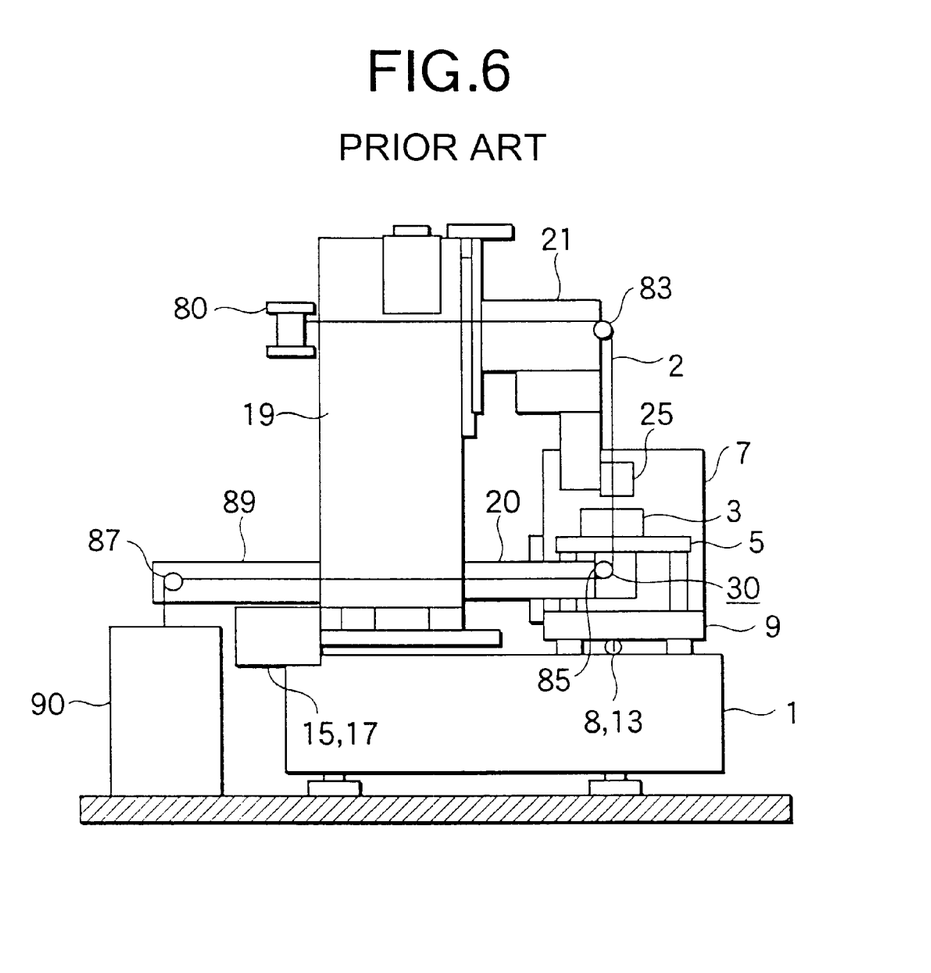
FIG. 6 is a side view of a wire electric discharge machine.
Figure 7A:
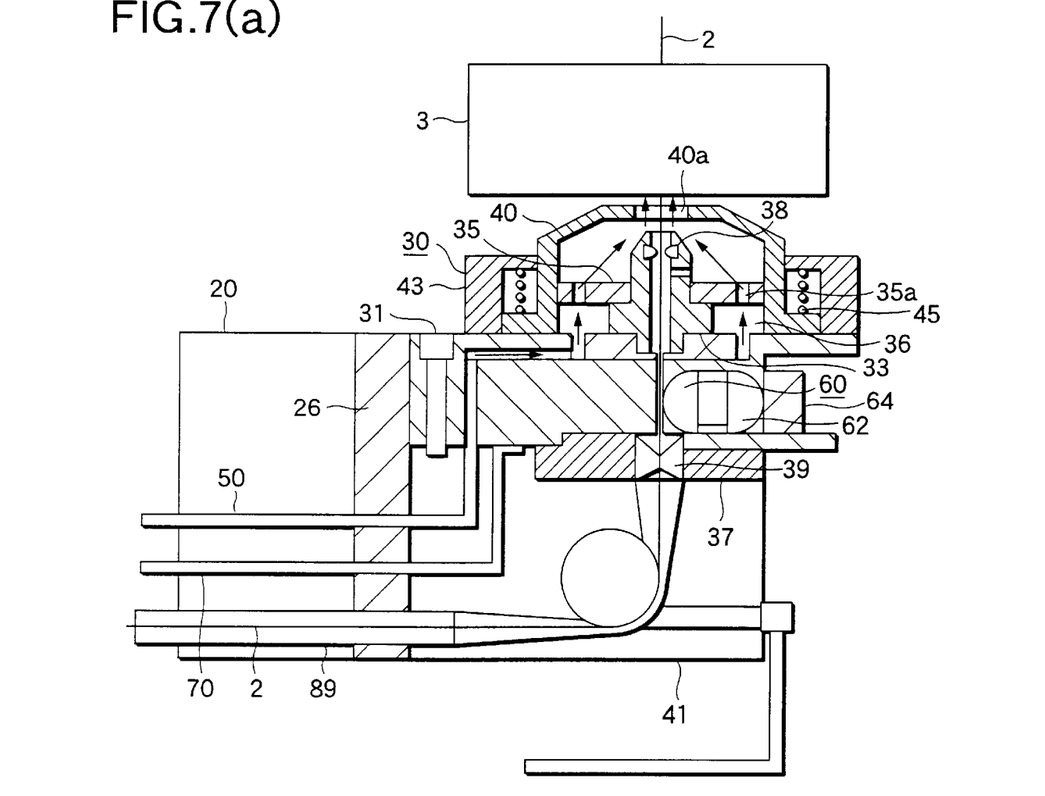
FIG. 7A is a sectional view and FIG. 7B is a plan view of the conventional guide main body portion.
Figure 7B:
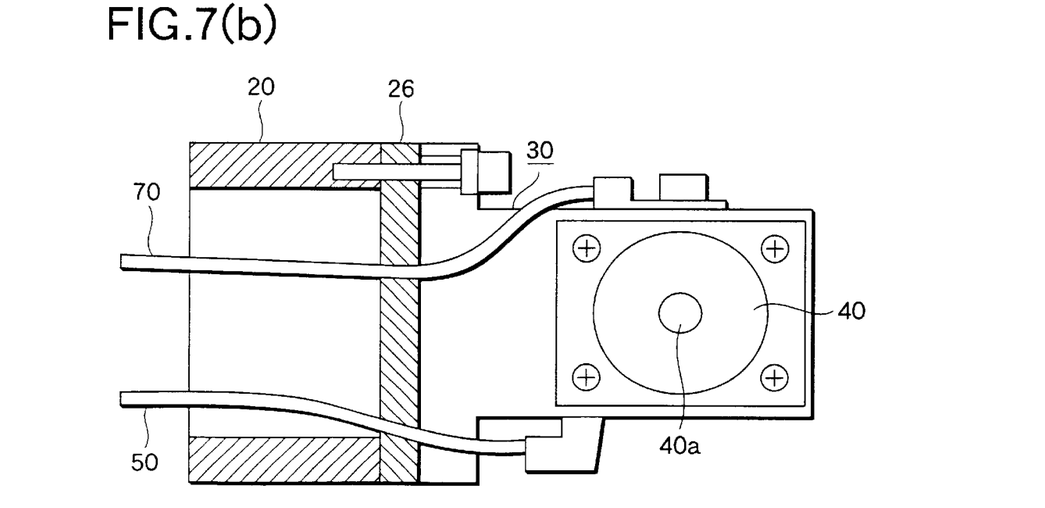

Referring to FIG. 6, FIG. 7(a) and FIG. 7(b), the conventional wire electric discharge machine will be described. In FIG. 6, FIG. 7(a) and FIG. 7(b), the wire electric discharge machine is composed of: a bed 1 which is a base; a table 5 to fix a workpiece 3 processed by a wire electrode 2; a processing tank 7 to pool the processing liquid; an X axis drive section 13 to move the table 5 in the X axis direction, by moving an X axis table 9 by the drive of an X axis motor 8; a Y axis drive section 17 to move the table 5 in the Y axis direction, by moving a column 19 along the longitudinal direction of a lower arm 20 fixed on the base 1 by the drive of a Y axis motor 15; a Z axis drive section 21 fixed on the column 19 to move the table 5 in the Z axis direction; an upper wire guide 25 which is fixed on the tip portion of the Z axis drive section 21 and guides the wire electrode 2; a lower wire guide 30 fixed on the lower arm 20 through an insulation plate 26, on the vertical surface of the tip portion of the lower arm 20; a feeding section 60 which is housed in the lower wire guide 30 and feeds the electric energy to the wire electrode 2; and a supply and collection section to supply the wire electrode 2 and to collect it.

The lower wire guide 30 flows the processing liquid to the work piece 3 while guiding the wire electrode 2, and the lower end portion of the guide main body portion 33 having a collar is engaged with and fixed onto a guide attaching plate 31 having a passage to supply the processing liquid to the work piece 3 and a guide hole through which the wire electrode 2 passes. A hollow cylinder portion to guide the wire electrode 2 is provided on the guide main body portion 33, and a central hole of a disk-like straightening plate 35 having a plurality of holes to flow the processing liquid is engaged with and fixed to the cylinder portion, thereby, a pool 36 is formed between the outlet of the passage of the guide attaching plate 31 and the holes 35a of the straightening plate 35.

An upper auxiliary guide 38 to guide the wire electrode 2 is fixed to the inside of the upper portion of the guide main body portion 33, and a lower auxiliary guide 39 is also fixed to the inside of an auxiliary plate 37 fixed to a lower portion of the guide attaching plate 31. Incidentally, the guide attaching plate 31 and the auxiliary plate 39 are fixed onto a lower block 41.

A nozzle 40 to jet the processing liquid is structured such that: the inner peripheral surface is fixed onto the outer peripheral surface of the straightening plate 35, the bottom surface is fixed onto a top panel of the guide attaching plate 31, and the top panel of the collar is fixed by a pressure plate 43 through a spring 45, thereby, the spring 45 is compressed by the pressure of the processing liquid and the tip is elevated, and by stop of the supply of the processing liquid, the tip is returned in order to prevent the contact with the work piece 3. Incidentally, a pipe 50 is connected to an inlet of the guide attaching plate 31. Further, because the basic structure of the upper wire guide 25 is the same as the lower wire guide 30, the explanation will be omitted.

The feeding section 60 is composed of a feeding dies 62 to feed the electric energy to the wire electrode 2, and a dies pressing plate 64 to fix this feeding dies 62, and is electrically connected to the feeding dies 62 through the guide attaching plate 31 formed of the conductive material by a wire 70 from a power source, not shown.

The supply and collect portion of the wire electrode 2 is structured in such a manner that the wire electrode 2 passes through a pipe 89 through rollers 83, 85 and 87 which convert the direction of the wire electrode 2 wound around a wire bobbin 80, and is accommodated in a collection box 90.

The operation of the wire electric discharge machine structured as described above, will be described below referring to FIG. 6 and FIG. 7. Initially, the feeding energy is electrically fed via the wire 70 to the wire electrode 2 through the feeding dies 62, and while the discharge between the work piece 3 and the wire electrode 2 is being generated, and the table 5 is being moved to the X, Y, or Z axis, by operating the X axis drive section 23, Y axis drive section 17, and Z axis drive section 21, the work piece 3 is processed to the desired shape.

On the one hand, during processing of the work piece 3, the processing liquid passes through the passage from the pipe 50 to the guide attaching plate 31, passes through the hole 35a of the straightening plate 35 to stabilize the directionality of jetting, and lightens the curvature of the fluid on the basis of the generation of the eddy flow caused through the pool 36 or the like, and jets from the jetting hole 40a of the nozzle 40. Such the jetted high speed processing liquid is supplied to the gap (hereinafter, called electrode gap) between the work piece 3 and the nozzle 40, and the processing sludge is delivered and removed, and the processing is continued while continuing the discharge by keeping the normal electrode gap and resistance value constant.

However, the processing liquid of the wire electric discharge machine structured as described above, passes through the passage of the guide attachment 31 from the pipe 50, and after it is temporarily stays in the pool 36 and the pressure is increased, and it passes by being converted into the velocity energy by the hole 35a of the straightening plate 35, and stays in the space portion formed by the inner surface of the nozzle 40 and the straightening plate 35, and after it becomes the pressure energy, the high speed fluid is jetted from the jetting hole 40a of the nozzle 40 into the electrode gap as the velocity energy.

That is, because a form of the energy of the processing liquid is converted as many as 4 times in both of the velocity and pressure, the processing liquid gradually losses the holding energy at the inlet of the guide attaching plate 31, and the velocity energy jetted from the jetting hole 40a of the nozzle 40 is lowered. Accordingly, when the electrode interval becomes large, because the pressure of the processing liquid is decreased, and the disturbance in the jetting direction is largely changed, there is a problem that the processing becomes unstable.

Further, the straightening plate 35 decreases the curvature or deflection of the fluid due to the generation of the eddy flow of the processing liquid inside the pool 36, and it stably jets the processing solution so that the directionality of the processing liquid jetted from the jetting hole 40a of the nozzle 40 is directed upward rightly, however, there is a problem that it generates the large pressure loss.

SUMMARY OF THE INVENTION

The present invention is attained to solve the above problem, and to provide a wire electric discharge machine in which the pressure loss is small in the case of jetting the processing liquid from the nozzle.

In order to attain the object, in a wire electric discharge machine of the first aspect, a wire electric discharge machine in which a work piece is processed, while the processing liquid exists between the wire electrode and the work piece, and the discharge is being generated, the wire electric discharge machine is characterized in that a jetting nozzle to jet the processing liquid toward the work piece, and the wire guide portion which flows the processing liquid to the jetting nozzle, and guides the wire electrode into the bored hole, are provided, wherein the wire guide portion has a first passage to flow the processing liquid into the jetting nozzle, and a second passage to convert the direction of the processing liquid to be flowed into the first passage, wherein the first and the second passages are plural.

The wire electric discharge machine of the second aspect is characterized in that: a feeding dies which is engaged with a cutout in which a side portion of the wire guide portion is cut out, and fixed to it; and which applies the voltage onto the wire electrode, and has the third passage constituting the first passage in the inside of the dies, is provided.

The wire electric discharge machine of the third aspect is characterized in that the vicinity of an outlet portion of the first passage is inclined toward the jetting hole of the jetting nozzle.

BRIEF DESCRIPTION OF THE DRAWINGS

FIG. 3 is a plan view and FIG. 3B is a sectional view of a feeding dies shown in FIG. 1.

DETAILED DESCRIPTION OF THE PREFERRED EMBODIMENTS

Next, an example of the present invention will be described as follows.

EXAMPLE 1

Figure 1A:
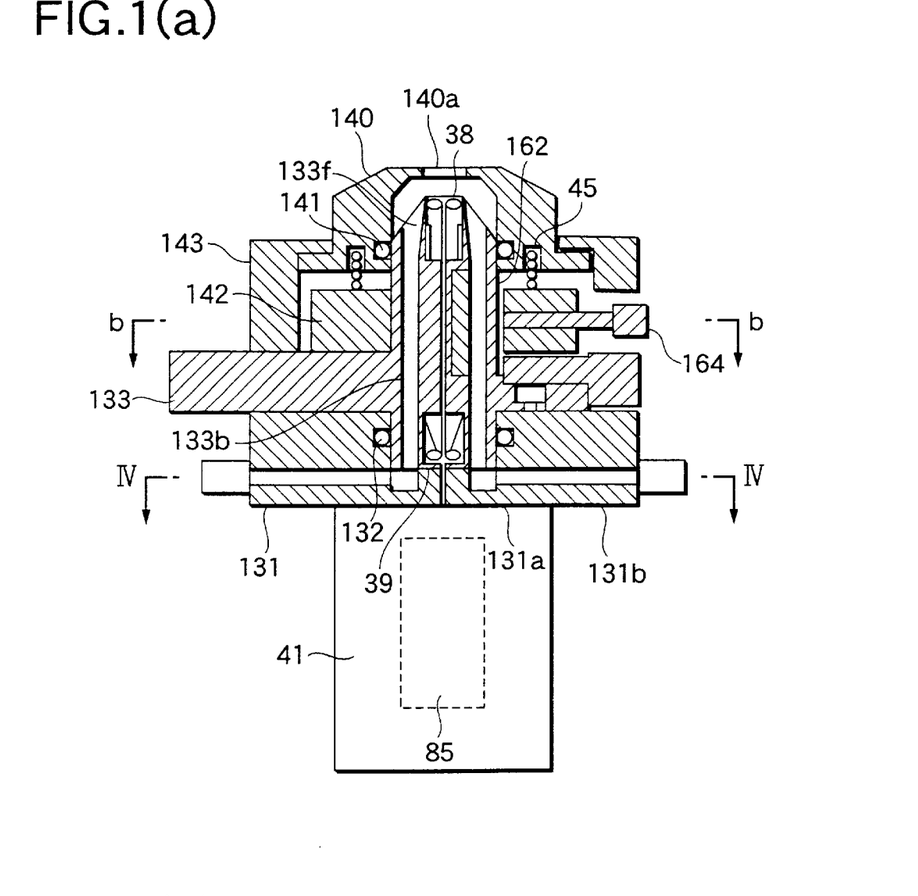
FIG. 1A is a sectional view of the lower guide according to an example of the invention.
Figure 1B:
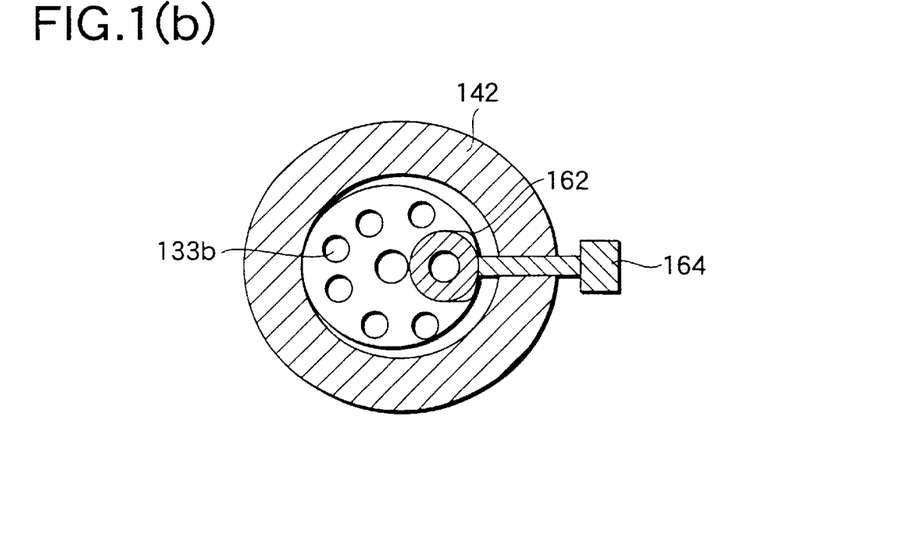
FIG. 1B is a sectional view shown by an arrowed line b—b of FIG. 1A.
Figure 2A:
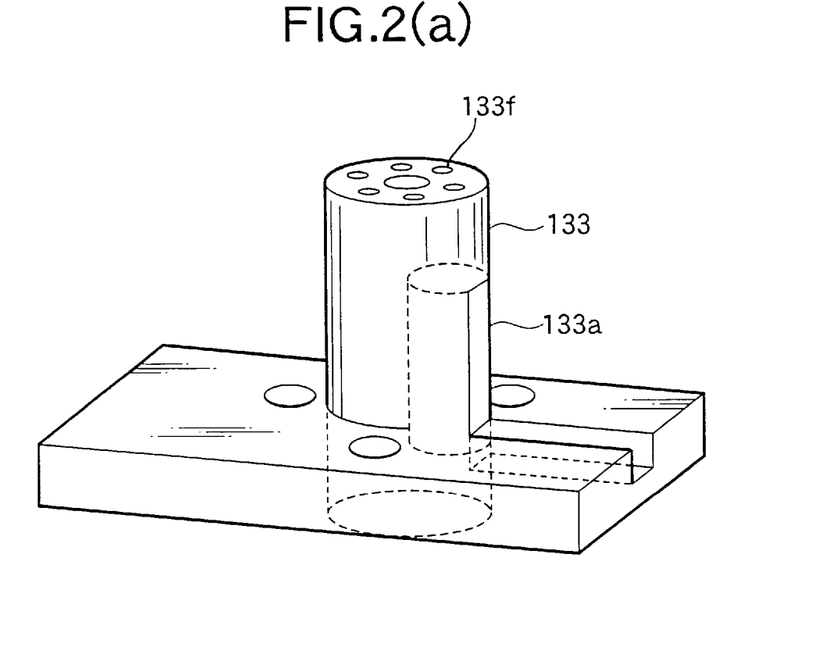
FIG. 2A is a perspective view and FIG. 2B is a sectional view of the lower wire guide main body portion shown in FIG. 1.
Figure 2B:
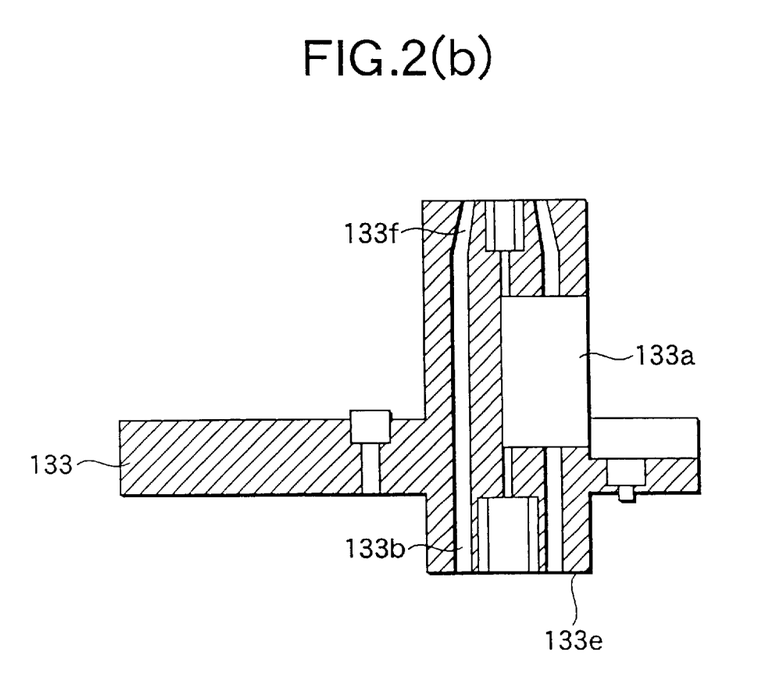
Figure 3:
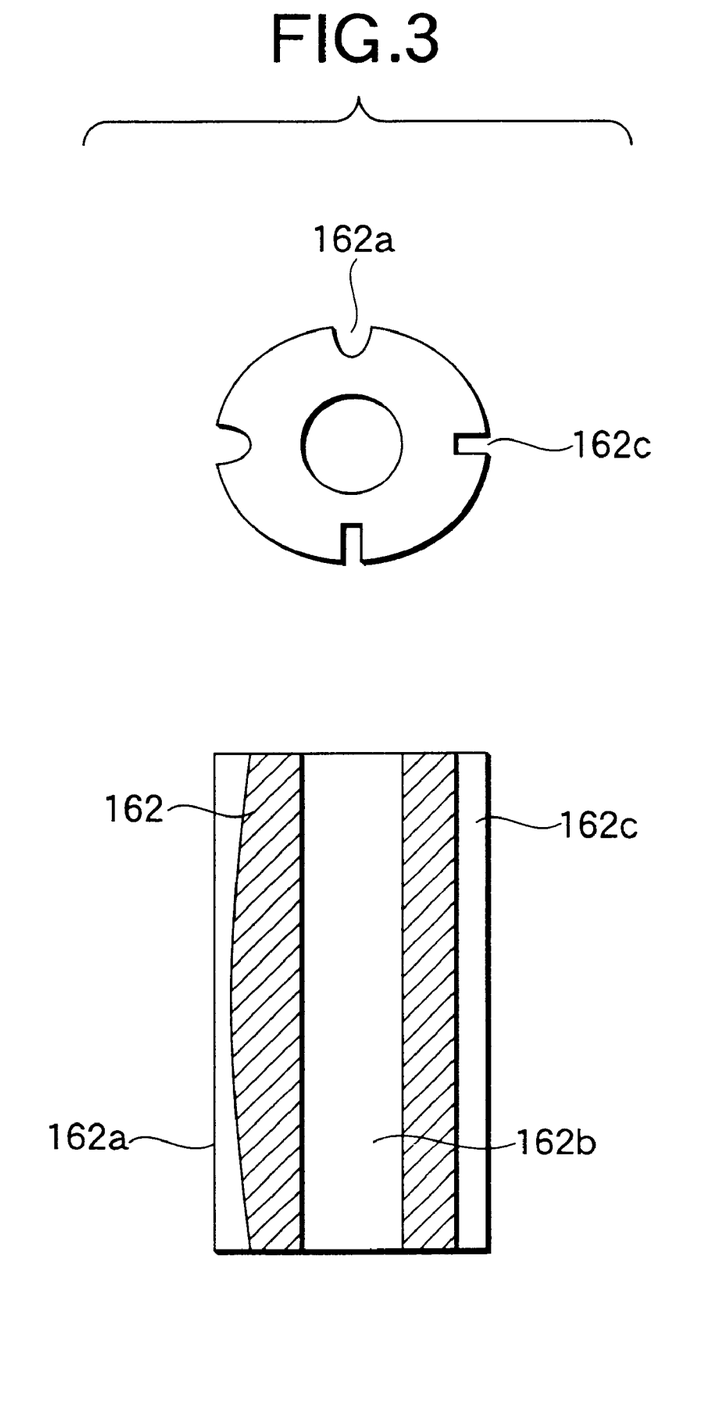
Figure 4:
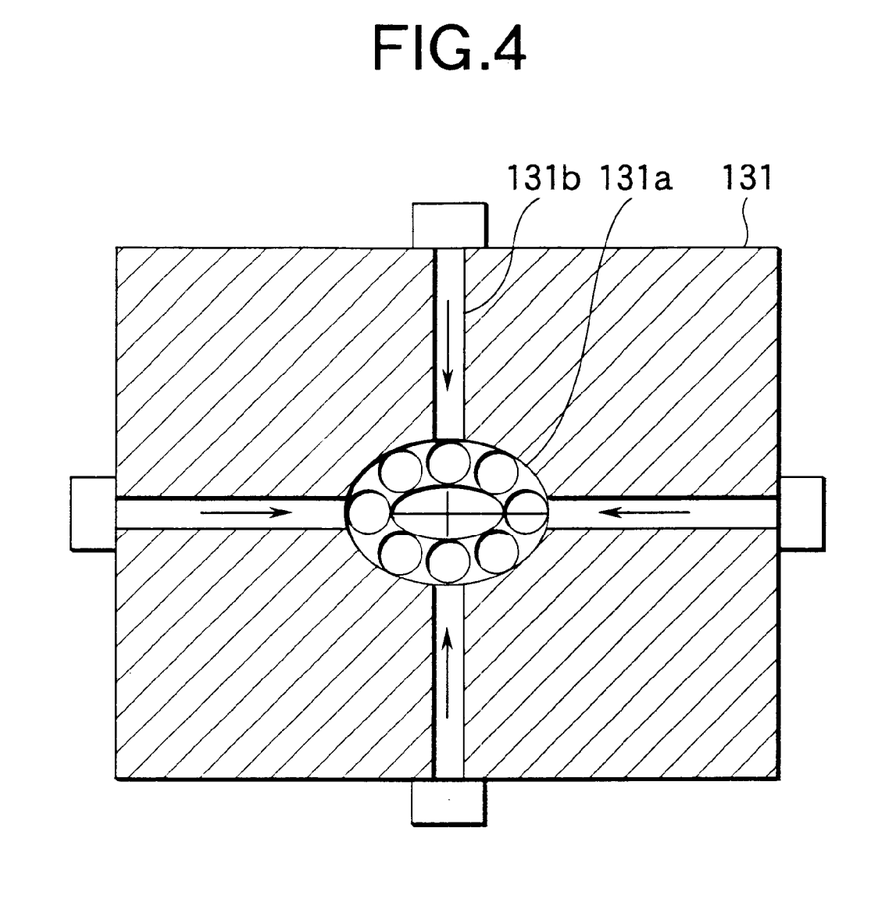
FIG. 4 is a sectional view shown by an arrowed line IV—IV of FIG. 1.
Figure 5:
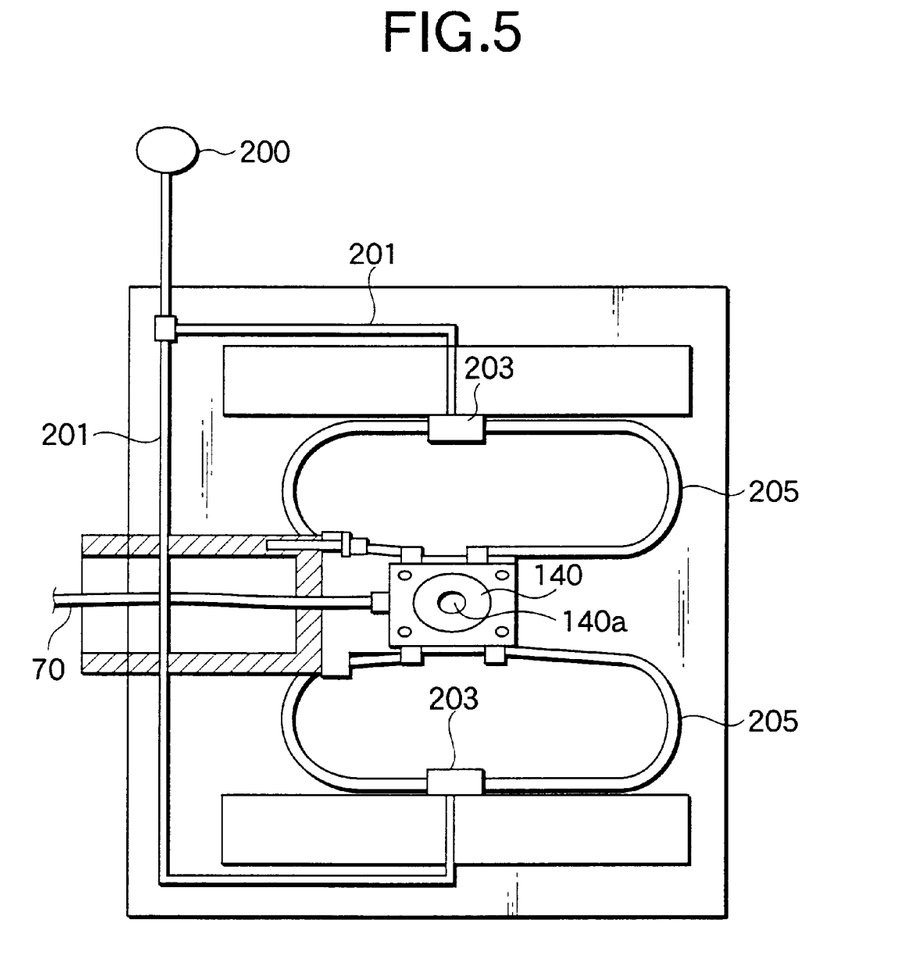
FIG. 5 is a plan view of a lower wire guide shown in FIG. 1.

Referring to FIG. 1–FIG. 5, an example of the present invention will be described. FIG. 1 is a sectional view of the lower wire guide, FIG. 2 is a perspective view and a sectional view of the lower wire guide main body portion shown in FIG. 1, FIG. 3 is a plan view and a sectional view of a feeding dies shown in FIG. 1, FIG. 4 is a sectional view shown by an arrowed line IV—IV of FIG. 1, and FIG. 5 is a plan view of a lower wire guide shown in FIG. 1.

In FIG. 1–FIG. 5, the lower wire guide is formed of: a guide main body portion 133 to jet onto the work piece 3 while guiding a wire electrode 2 to a hole bored at the central portion; an almost cylindrical feeding dies 162 engaged with a cutout portion 133a of the guide main body portion 133; a donut-like ring 142 by which the feeding dies is movably engaged with the outside of the guide main body 133, and which is fixed by a bolt 164 so that the external force is hardly applied onto the guide main body portion 133; and a nozzle 140 to jet the processing liquid, which is engaged so as to be slidable, though an O-ring 141 with the outer peripheral surface of the guide main body portion 133.

The guide main body portion 133 has a linear first passage 133b to flow the processing solution, and a passage 133f which is inclined toward the jetting hole 140a of the nozzle 140, connected to this passage 133b, and wire auxiliary guides 38 and 39 are respectively fixed to the upper and lower cylindrical concave portions, and the convex portion 133e provided on the lower end is engaged with the concave portion of the guide attaching plate 131 through an O-ring 132 and fixed to it.

In the inside of the guide attaching plate 131 fixed on the lower block 41, a pool 131a to temporarily stay the processing liquid, and a passage 131b for flowing the processing liquid formed into a cross from 4 directions connected to a pipe 205, are provided, and the end portion of the passage 131b is connected to the passage 133b. Namely, the flow velocity is lowered and the unnecessary pressure loss is suppressed, when the processing liquid flows to a plurality of passages 131b. Incidentally, to the pipe 205, the fluid supplied from the pump 200 is connected, via a junction block 203 through the pipe 201. Then, this is structured such that, by flowing the processing liquid flowed from the 4 passages 131b to 8 passages 133b through the pool 131a, the pressure loss of the processing liquid is more decreased.

In the feeding dies 162, a plurality of groove-like feeding sections 162a which feed the electric energy while contacting with the wire electrode 2, are provided on the periphery, and the third passage 162b connected to the passage 133b of the guide main body portion 133 bored in the central portion, is provided, and a rotation groove 162C to rotate the feeding dies 162 from the outside is provided on the opposite side of the feeding portion 162a.

In the nozzle 140, when the collar portion in which the spring 45 mounted on the upper surface of the ring 142 is engaged with the concave portion is stopped on a stopper plate 143, the collar portion is formed so as to be always lifted upward. Incidentally, the bottom surface of the stopper plate 143 is fixed onto the top panel of the guide attaching plate 131.

Referring to FIG. 1–FIG. 5, and FIG. 6, the wire electric discharge machine structured as described above, will be described. Initially, the energy from the power source feeds the electric energy to the wire electrode 2 through the feeding dies 162, and while the discharge is generated between the work piece 3 and the wire electrode 2, and while the table 5 is being moved in the X, Y, or Z axis, by operating the X axis drive section 13, Y axis drive section 17, and Z axis drive section 21, the work piece 3 is processed into the desired shape.

On the one hand, during the processing of the work piece 3, the processing liquid passes from the pump 200 through the pipe 201, passes through the pipe 205 via the junction block 203, passes through the cross passage 131b of the guide attaching plate 131, and temporarily stays in the pool 131a, and passes though the passage 133b of the guide main body portion 133 and the passage 162b of the feeding dies 162, flows through the passage 133f of the guide main body 133, and is supplied from the jetting hole 140a of the nozzle 140 at the high speed into a space between electrodes, and the processing sludge is delivered and removed, and while the discharge is being continued, by keeping the normal electrode interval and resistance constant, the processing is continued.

According to the first invention, the jetting nozzle to jet the processing liquid to the work piece, and the wire guide portion to flow the processing liquid to the jetting nozzle, and to guide the wire electrode to the bored hole, are provided, and in the wire guide portion, the first passage to flow the processing liquid into the jetting nozzle, and the second passage to convert the direction of the processing liquid to be flowed into the first passage, the first and the second passages being plural, thereby, there is an effect that the pressure loss of the processing liquid in the first passage and the second passage is lowered, and the velocity energy of the processing liquid jetted from the jetting nozzle is hardly decreased so that a velocity of the processing liquid in the first and the second passages is decreased to reduce a pressure loss.

According to the second invention, in addition to the effect of any one from the first invention, because the feeding dies in which the side portion of the wire guide portion is cut out, and which is engaged with the cutout and fixed, and which supplies the voltage onto the wire electrode, and has the third passage constituting the first passage, is provided in the inside of it, there is an effect that the processing liquid flows the third passage, which is the inside of the feeding dies, and the feeding dies is easily cooled.

According to the third invention, in addition to the effect of any one from the first and the second inventions, because the vicinity of the outlet portion of the first passage is inclined toward the jetting hole of the jetting nozzle, there is an effect that the flow velocity of the processing liquid in the wire guide portion is hardly lowered, and the jetting speed of the processing liquid from the jetting nozzle can be increased.

As described above, the wire electric discharge machine according to the present invention is appropriate for the purpose of use in which the processing liquid is effectively supplied to the jetting nozzle.

What is claimed is:

1. A wire electric discharge machine in which a processing liquid fills a gap between a wire electrode and a work-piece, and the work-piece is processed while electric discharge is being generated,
   said wire electric discharge machine comprising:
   a jetting nozzle to jet the processing liquid to the work-piece, and
   a wire guide portion to direct the processing liquid to said jetting nozzle and to guide said wire electrode into a bored hole; wherein
   said wire guide portion includes:
   a plurality of first passages to direct the processing liquid into said jetting nozzle, and
   a plurality of second passages to convert the direction of the processing liquid flowing into said first passages.

2. A wire electric discharge machine in which a processing liquid fills a gap between a wire electrode and a work-piece, and the work-piece is processed while electric discharge is being generated,
   said wire electric discharge machine comprising:
   a jetting nozzle to jet the processing liquid to the work-piece, and
   a wire guide portion to direct the processing liquid to said jetting nozzle and to guide said wire electrode into a bored hole; wherein
   said wire guide portion includes:
   a first passage to direct the processing liquid into said jetting nozzle, and
   a second passage to convert the direction of the processing liquid flowing into said first passage, further comprising:
   a feeding die in which a side portion of said wire guide portion is cut out, and which is engaged with and fixed to the cutout, and applies the voltage onto said wire electrode, and which has a third passage connected to said first passage.

3. The wire electric discharge machine according to claim 1, wherein
   the vicinity of an outlet of said first passage is inclined toward the jetting hole of said jetting nozzle.

4. The wire electric discharge machine according to claim 2, wherein
   the vicinity of an outlet of said first passage is inclined toward the jetting hole of said jetting nozzle.

* * * * *